June 2, 1925. 1,540,351
R. J. McFALL
LEATHER MEASURING MACHINE
Filed Dec. 17, 1920 4 Sheets-Sheet 2

INVENTOR:
Robert J. McFall
by Macleod, Calver, Copeland & Dike
Attys.

June 2, 1925.

R. J. McFALL 1,540,351

LEATHER MEASURING MACHINE

Filed Dec. 17, 1920 4 Sheets-Sheet 3

INVENTOR:
Robert J. McFall
by Macleod, Calver, Copeland & Dike
ATTYS.

June 2, 1925.

H. EISELE

QUARTERING DEVICE FOR LOCOMOTIVE WHEELS

Filed May 28, 1924

INVENTOR
Henry Eisele
BY
ATTORNEY

June 2, 1925.

R. J. McFALL

LEATHER MEASURING MACHINE

Filed Dec. 17, 1920 4 Sheets-Sheet 4

INVENTOR:
Robert J. McFall
by Macleod, Calver, Copeland & Dike
ATTYS.

Patented June 2, 1925.

1,540,351

UNITED STATES PATENT OFFICE.

ROBERT J. McFALL, OF AMHERST, MASSACHUSETTS.

LEATHER-MEASURING MACHINE.

Application filed December 17, 1920. Serial No. 431,331.

*To all whom it may concern:*

Be it known that I, ROBERT J. McFALL, a citizen of the Dominion of Canada, residing at Amherst, county of Hampshire, State of Massachusetts, have invented a certain new and useful Improvement in Leather-Measuring Machines, of which the following is a specification, reference being had therein to the accompanying drawings.

My invention relates to machines for measuring the irregular surfaces of such things as hides, skins and leather, and has for its object a machine which shall be much more accurate than machines now in use. It is also capable of being run at greater speed without lessening its accuracy.

Rotary leather measuring machines as heretofore constructed have been incorrect for several reasons:—

First—because the leather is measured by the rotation of a series of wheels which contact with the leather, and these wheels begin to rotate as soon as the edge of the leather touches them and continue to rotate as long as the wheel is in contact with the leather, so that the area indicated by the machine is greatly affected by the thickness, a thick hide showing a larger area than a thin one of the same size.

Second—because the wheels are of appreciable width and the two wheels which rest on the extreme outside portions of the leather contribute to the total measurement, amounts equal to two rectangles the full width between the centres of the wheels and the length of the strips, when in reality the actual areas of these portions of the leather usually are but a small fraction of the amount thus contributed to the total.

Third—because each of the wheels continues to rotate as long as it remains on any portion of the imaginary strip of leather which the wheel measures and, therefore, in effect measures each strip as if it were a rectangle having for its longest side the extreme length of the imaginary strip which is being measured.

As is well known to those skilled in the art and chiefly for the reasons explained above, leather measuring machines as now constructed will not measure the same hide twice and obtain the same results. The inaccuracy is so great that it greatly impairs the usefulness of the machines.

The machine embodying my invention is intended to obviate these difficulties and is capable of being operated rapidly and accurately.

The increased accuracy of my machine is derived in part from the use of a contact member of such a shape that, in traversing the leather, it will not set the measuring mechanism in operation before the edge of the leather has been reached nor continue it in operation after the rear edge of the leather has been passed. The increased accuracy also results in part from the fact that the contact member is made very narrow so that the area of contact is reduced almost to a point.

The method of ascertaining the length of line traversed by the several contact members and obtaining the aggregate of the length of these lines is based on a new principle of operation. In the machine embodying my invention, each contact member sets in motion a rotating drum which exerts a pull against a yielding member such as a suspended weight. These suspended weights are so arranged that they exert an aggregate pull against a grand weight or set of grand weights, the movement of which is recorded by a series of numbered wheels and indicates the total area measured by the contact members. This mechanism makes it possible to obtain the total of the leather in a single hide or the grand total of the area of a series of hides or of the hides measured in a day's work.

It will be understood that the drawings forming part of this application show what I believe to be the best embodiment of my invention, but that they are not to scale, and that details of mechanisms not forming part of the invention have been omitted to make it possible to show the other parts with greater clearness. It will also be understood that, except as stated in the claims, I do not intend to limit myself to any particular structures or modes of operation shown or described herein since I believe my invention to be of basic character.

The invention will be fully understood from the following description when taken in connection with the accompanying drawings, and the novel features thereof will be pointed out and clearly defined in the claims at the close of this specification.

Figures 1, 11, 12, 13, 14, 15:
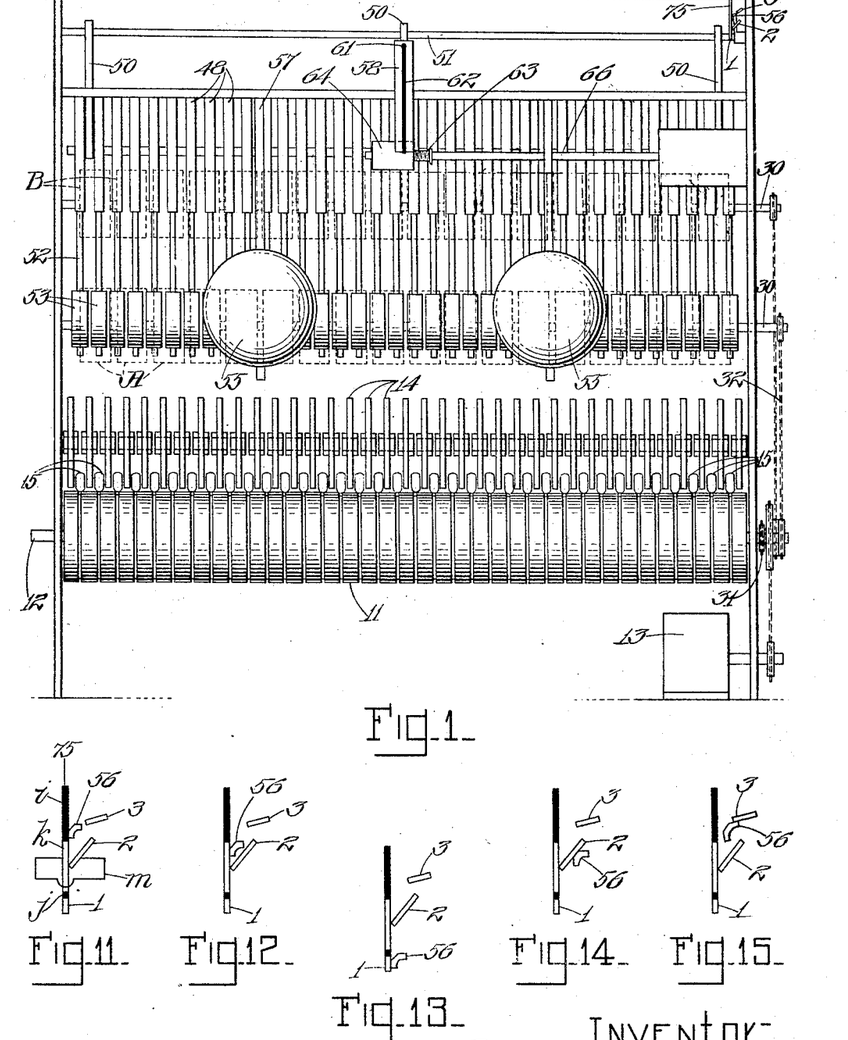
Fig. 1 is a front elevation of a machine embodying my machine.
Figs. 11 to 15 are diagrams showing the several positions of the contact arm 56 in relation to the three conducting surfaces 1, 2 and 3 which control the winding circuits and the releasing circuit of the machine.
Figure 1:
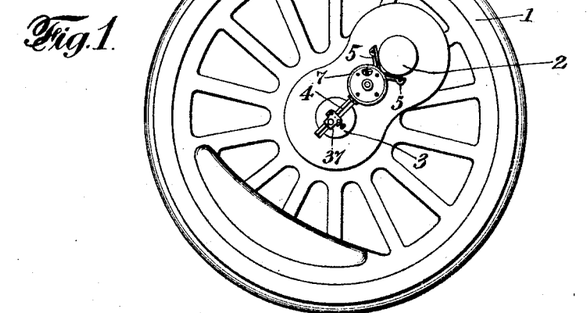
Figures 2, 3, 4, 5:
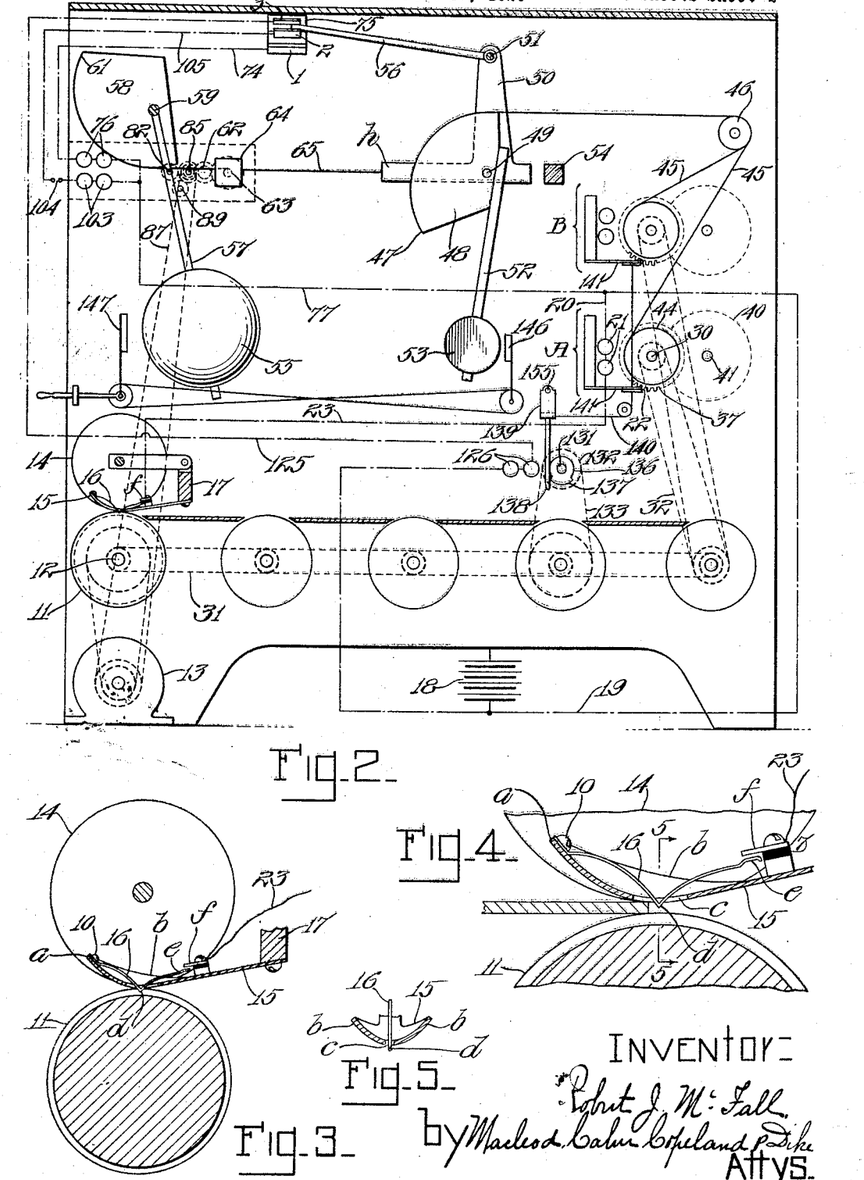
Fig. 2 is a view in elevation and partly in diagram of the right-hand side shown in Figure 1, the right-hand side wall of the frame being omitted for greater clearness of illustration.
Fig. 3 is a detail on an enlarged scale of the contact mechanism and associated parts.
Fig. 4 is a detail on enlarged scale illustrating the operation of the contact mechanism.
Fig. 5 is a section on line 5—5 of Fig. 4.
Figure 2:
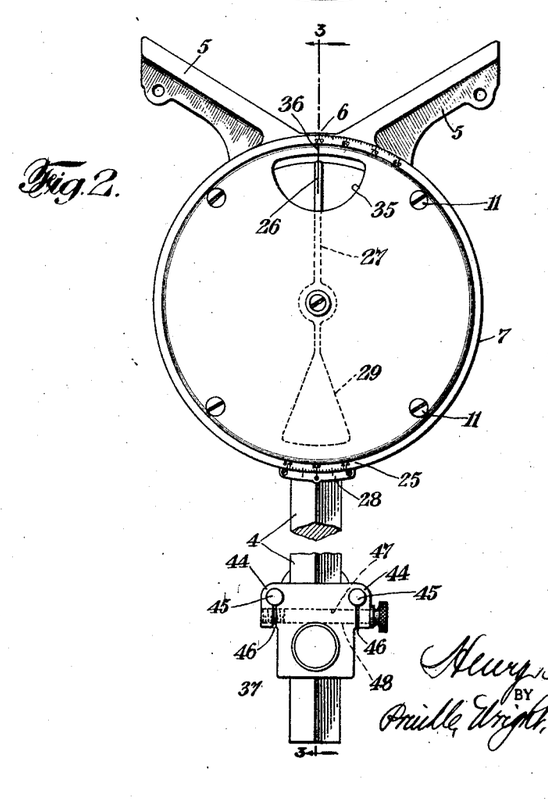

Referring now to the drawings and particularly to Figures 1 and 2, there is shown at 11 a grooved bedroll extending the entire width of the machine, mounted on a shaft 12 driven by a motor 13. Arranged above the bedroll is a series of feed wheels 14 driven by contact with the leather.

Located between the feed wheels are groups of devices which for convenience are called "contact mechanisms". It will be understood that as many of these contact mechanisms will be supplied as are necessary and that the accuracy of the machine will be increased somewhat in proportion to the number of contact mechanisms which are employed, since by so doing, the imaginary strip of leather measured by each contact mechanism is reduced in width, and consequently, any inaccuracy due to the error in measurement on the irregular ends of the strip is reduced. Each contact mechanism comprises a spoon-shaped shield 15 and a movable contact member 16. The spoon-shaped shield 15 is yieldingly supported by a rearward extension attached to a fixed member or bar 17 which runs the length of the machine. The front edge $a$ and sides $b$ of each shield are inclined upwardly away from the bedroll 11 so that the shield always rides upon the leather whether thick or thin and whether presented with edge at right angles or obliquely, and so that the leather may pass rapidly under it without injuring it. It will be seen that the leather may pass under the shield in a straight line from front to back of the machine and that the irregular edges may also pass under in a diagonal or slanting direction. Mounted on this shield and extending through a hole $c$ therein is the electric contact member 16 forming part of an electric circuit. In the drawings, there is shown electric contact mechanism, but I do not limit myself to electrically operated mechanism, since there exist other contact mechanisms which are capable of use in this connection. Contact member 16 consists of a small V-shaped spring secured at 10 to the outer end of the shield 15 and having a point $d$ which extends through the hole $c$ in the shield 15. The contact member 16 terminates in a free end $e$ which can be moved by the leather until it touches the underside of a button $f$ also mounted on the shield 15 but electrically separated therefrom by insulation 7. The point $d$ of the contact member 16 extends through the hole $c$ and into the groove in the bedroll 11 for a minute distance but sufficient so that no sheet of material however thin can be passed through the machine without moving each contact member sufficiently to cause it to touch its corresponding button $f$. It will be understood that the point $d$ of the contact member 16 never touches the bedroll, being prevented from doing so by the grooves in the bedroll 11.

By examination of Figure 4, which illustrates the action of these parts, it will be seen that when a thick piece of leather is passed through the machine, it strikes the upturned portion of the front of the shield a considerable time before it reaches the point of tangency of the bedroll and the feed wheels. Upward movement of the shield 15 to the position shown in Figure 4 does not actuate the measuring instrumentalities of the machine, because movement of the shield does not close the electric circuit through the button $f$. Just before the edge of the leather reaches the point of tangency, it strikes the contact member and lifts it until its free end $e$ is in contact with the button $f$. It will also be seen that the closing of the electric circuit does not take place when the leather touches the contact member but only when it has lifted it and brought it into contact with the button. These features contribute materially to the accuracy of the machine. Reverse action occurs when the leather passes out from under the contact member. By giving the parts proper shape, inaccuracy which would otherwise be caused by variation in thickness of the leather can be practically eliminated.

The movement of the contact member 16 closes an electric circuit which includes a battery 18 (see Fig. 2) grounded on one side to the frame of the machine and connected on the other side by wires 19 and 30 with two electro magnets 21 (see Figs. 2 and 6) which are also connected by a wire 23 with the contact button *f*. These magnets act on an armature 25 and hold it in contact with the magnets as long as leather is passing under the contact member. In other words, the strip measured by each contact member actuates its magnets for a length of time proportional to the length of the line measured.

The mechanism by which this length of time is converted into a proportional pull or stress acting on a yielding member, will now be described.

This group of mechanism is conveniently termed "power-operated pulling mechanism", and one of these groups of power-operated pulling mechanisms is provided for each contact member. The total pull exerted by all of these mechanisms is acted against by another group of devices which will be described later and which is conveniently termed the "accumulator pulling mechanism." The groups of pulling mechanisms may be arranged in two or more banks, the lower one being indicated at A and the upper one at B in Figure 2. Each group of pulling mechanism includes the pair of magnets 21 and an armature 25. One of the power-operated pulling mechanisms is shown in detail in Figure 6 on an enlarged scale. The armature 25 is secured to a spring 26 fastened to the frame of the machine, as shown at 27, and carries a forked arm 28 which engages the collar member 29 of a toothed clutch. This collar member is mounted on a shaft 30 which is constantly driven by chains 31, 32 in synchronism with the bedroll 11. The collar 29 is secured to the shaft 30 by a pin 33 passing through a slot 34 in the collar. This permits the collar to be slid lengthwise on the shaft 30 by the fork 28 carried on the armature 25. The clutch collar 29 engages the clutch hub 35 to which is secured a pinion 36 and a brake and ratchet wheel 37. The periphery of the brake wheel 37 is held yieldingly by a spring 39 toward stationary friction members 38, 38 secured to the frame of the machine. The brake member prevents the pinion 36 and attached parts spinning after the armature 25 has released the clutch collar 29. It will be understood that I do not limit myself to the particular mechanism shown for stopping the pinion immediately, since other well-known mechanisms can be used with equal success. The pinion 36 meshes with a gear 40 on shaft 41. The gear 40 carries a pinion 42 meshing with a gear 43 secured to a drum 44 loosely mounted on the shaft 30. The several gears form a reduction train between the shaft 30 and the drum 44 so that the movement of the shaft 30 produces a slow powerful movement of the drum 44 which continues as long as the contact member 16 holds the armature 25 against the magnets 21. The wheel 37 has a notched periphery and is held positively from reverse rotation by a pawl 141 (see Fig. 2), the operation of which will be described hereafter.

On the drum 44 is wound a flexible member 45 which may be either wire or ribbon. This flexible member 45 passes over an idler 46 and is secured at 47 to a sector or cam 48 pivoted at 49 to a frame having end members one of which is shown at 50 (see Fig. 2). This frame is suspended from and free to move about a pivot 51 and carries the entire series of sectors 48 for the machine. Each sector is provided with a downwardly extending arm 52 and weight 53. At 54 is shown a stop to prevent movement of the frame 50 beyond a predetermined point toward the right, as shown in Figure 2.

From the foregoing description, it will be seen that whenever one of the contact members 16 is lifted by the passage of leather through the machine, it sets in motion the corresponding drum 44 which winds up the flexible member 45, and begins to swing the sector 48 about its pivot 49, at the same time lifting the weight 53 and swinging the whole frame 50 toward the stop 54. When other contact members 16 are moved by the passage of leather, other weights 53 are lifted and the whole produces a cumulative stress on the frame 50 which is proportioned to the total area measured by the contact members. This total stress is resisted by mechanism which returns the parts to a condition of equilibrium and also records the areas measured. This mechanism will now be described.

Figure 10:
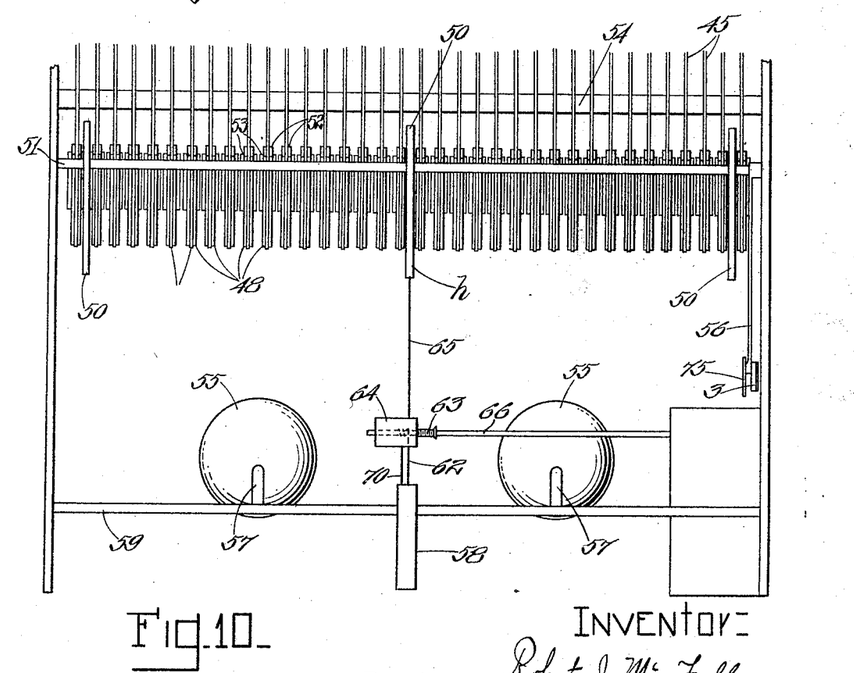
Fig. 10 is a plan view of the front end of the machine, certain portions being omitted for clearness of illustration.

At 59 is indicated a shaft upon which is rigidly mounted a sector 58. This shaft is provided with arms 57 at the lower end of each of which is a weight 55 conveniently called a grand weight. In the drawings, I have shown two such weights (see Figs. 1 and 10), which act in unison and are sufficient to counteract the series of smaller weights 53. Secured at 61 to the sector 58 is one end of a flexible member 62, the other end of which is fastened to a spool 63 which is mounted in a frame 64. The frame 64 has secured to it one end of a connecting member 65, preferably a wire, which is fastened at its other end to an arm *h* on the swinging frame 50. The spool 63 is splined, as shown at 67 in Figure 7, to a shaft 66 so that it can slide lengthwise of the shaft but will be revolved by it. The portion of the spool which passes through the frame 65 is screw-threaded, so that as it is revolved by the shaft 66, it will slide in the frame 64. The pitch of the screw-threads corresponds to the thickness of the flexible member 62 so that the flexible member will always be wound on the spool in a smooth helix and the spool will not pull or drag the flexible member 62 sideways. The shaft 66 is connected by a universal joint 69 to the shaft 71. This shaft carries a gear 72 and also a spring case 73 containing a helical spring 74 which maintains the wire 62 under slight tension when the winding mechanism is released, and prevents the spool overrunning, thus keeping the mechanism in condition to start again immediately. At 70 is shown a wire secured at one end to the sector 58 and at the other end to the frame 64. This wire slackens as the spool begins to wind, but when the spool is unwound, it is taut and holds weights 53 and 55 in equilibrium.

The function of the mechanism just described is to wind up the wire 62 and thus restore the state of equilibrium between the grand weights 55 and the series of small weights 53 as fast as the same is disturbed by additional stress put upon the connections by the passage of additional leather under the contact members. The rotation of the shaft 66 and the consequent winding up of the wire 62 is set in motion by the action of a contact arm 56 and the three conducting surfaces 1, 2 and 3 which will be described in greater detail hereafter. These devices control three circuits as follows:—

1, the units circuit which sets in motion mechanism which drives the shafts at a high rate of speed, winding the wire rapidly and moving counting mechanism which records the units or feet which the machine has measured; 2, the hundredths circuit which sets in motion similar mechanism operating at a relatively low speed and winding the wire only one hundredth part as fast as does the mechanism of the units circuit; and 3, the release circuit which actuates certain pawls and permits the weights to fall back into the position of rest.

The construction of the conducting surfaces, of the circuits and of the mechanism operated by them will be described in order. The arm 56 is of conducting material and is of the shape shown in Figures 11 to 15 which are diagrams showing the different positions of the contact arm 56 when viewed endwise. In the path of the arm 56 are the three contact members or conductors 1, 2 and 3, 2 and 3 being yielding and set at an angle, as shown in these figures. At 75 is shown a guide member comprising the conductor $l$ and insulating surfaces $i$ and $j$ and a conducting surface $k$. The surface $k$ and the contact member 2 are electrically connected, as shown at $m$. The construction of these parts is such that when the contact arm 56 moves down, starting from the position shown in Figure 11, it will follow the guide member 75, but when it moves up, it will pass outside the brush 2, as shown in Figure 14, and will then push the brush 3 aside, making momentary contact with brush 3 and snapping back into the position shown in Figure 11.

Figure 8:
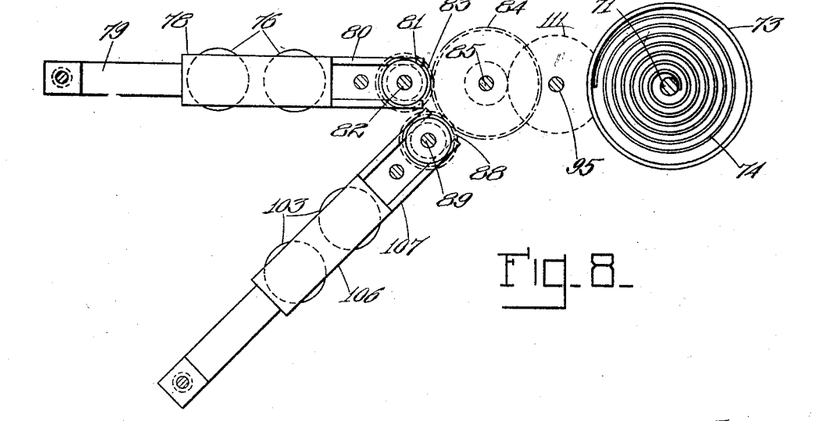
Fig. 8 is a section on line 8 of Figure 7.

The units circuit includes the conductor 1, the wire 74, electric magnets 76 and wire 77, as shown in Figure 2. The magnets 76 (see Figs. 7 and 8) operate an armature 78 on a spring 79 and carrying a clutch fork 80 which surrounds hub 81 secured to a shaft 82 which is slidable lengthwise in the frame of the machine. On the outer end of this shaft 82 is a gear wheel 83 meshing with another gear 84 which runs loose on the shaft 85. The gear wheel 84 is formed integrally with a sprocket wheel 86 driven by a chain 87 from a constantly running part of the machine. As will be explained later, the gear wheel 84 is also in constant mesh with a third gear wheel 88 secured to a shaft 89, these forming part of the hundredths system operated by the hundredths circuit. As will be seen, the gears 83 and 88 and their shafts 82 and 89 are kept constantly running so that any mechanism temporarily connected to them will be operated as long as the connection is maintained.

On the shaft 82, is a toothed clutch 90, the loose member of which is secured to a pinion 91. This pinion 91 meshes with a gear 92 loose on shaft 85. The gear 92 carries a pinion 93 which meshes with a gear 94 on a shaft 95. The gear 94 also carries a pinion 96 which operates the gear 72 on shaft 71 as already described. This arrangement of parts is such that when the contact arm 56 closes the units circuit by contact with the brush 1, as shown in Figure 13, the magnets 76 cause the clutch 90 to engage, and the constantly running shaft 82 then drives the shaft 71 to wind up the wire 62 as previously explained.

Figures 6, 7, 9:
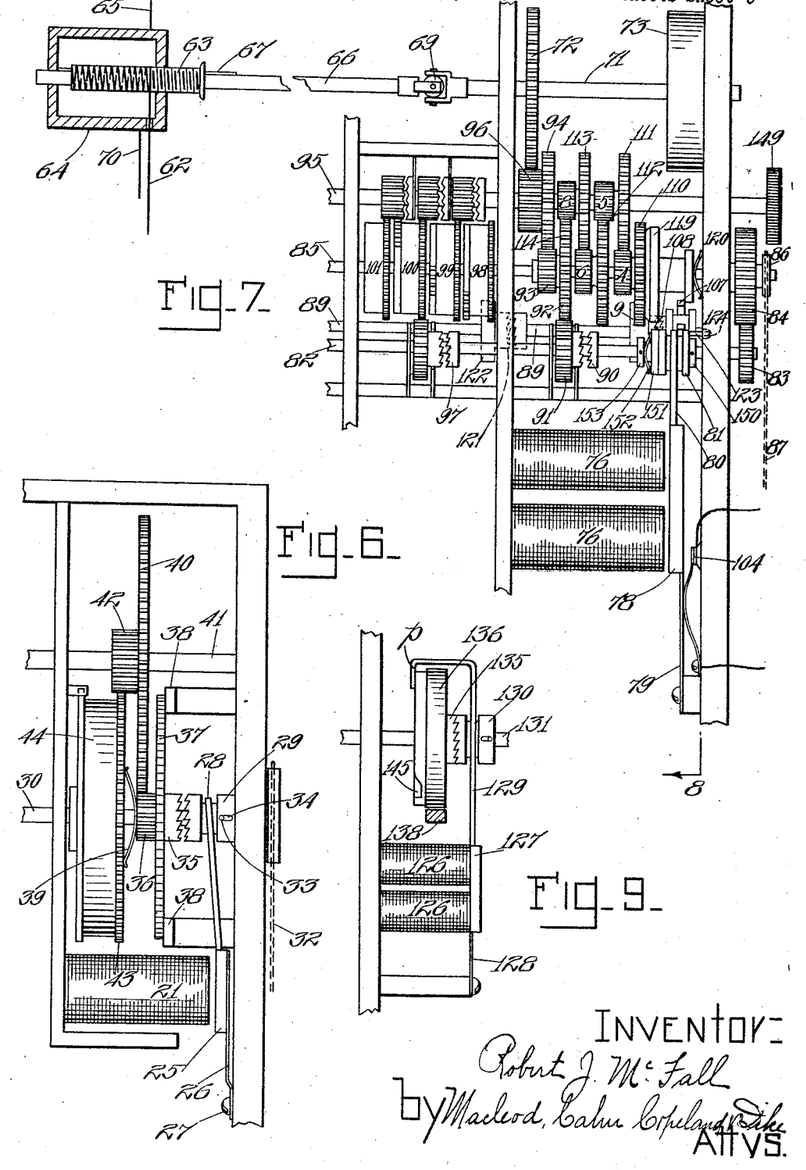
Fig. 6 is a plan view of one of the power-actuated pulling mechanisms, as for instance, the one designated A in Figure 2.
Fig. 7 is a plan view of the winding mechanism and associated parts, being the portion of the machine shown in the upper left-hand corner of Figure 2.
Fig. 9 is a plan view of a portion of the releasing mechanism for the power-actuated pulling mechanisms.

The movement of the shaft 82 to the left, as shown in Figure 7 also actuates another toothed clutch 97 by means of which the counting mechanism is actuated. The counting mechanism may be of any well-known construction. In the drawings, I have shown one composed of four sections, 98, 99, 100 and 101, these being respectively to indicate hundredths, tenths, units and tens respectively. As will be seen, the clutch 97 engages the gear wheel of the units section 100, and therefore also actuates the sections of the counting mechanism which are at the left, but not those which are at the right. The counting mechanism need not be described in greater detail, as it may be of any well-known construction and merely serves to count the revolutions made by shaft 82 and also, as will be described later, the revolutions made by shaft 89.

The fractional circuit and the mechanism operated by it will now be described. This circuit includes the conductor 2 and the conducting surface $k$ of the guide 75, also a pair of magnets 103 (see Fig. 8), a switch 104 (see Fig. 7) and the wire 105 which is electrically connected with the wire 77 leading to the battery. The magnets 103 operate an armature 106 and clutch fork 107, the parts being similar in construction to those already described in connection with the units circuit. The clutch fork 107 moves the shaft 89 endwise and causes the clutch 108 to engage so that its pinion 9 actuates gear 110, this construction being the same as that already described in connection with the units circuit. This gear 110 drives gear 72 on shaft 71 by a reduction train comprising gears 111, 112, 113, 114 and 94 which has already been described, and pinions 4, 5, 6, 8, 93 and 96, the last two having already been described. This train of gears gives the necessary reduction so that the shaft 89 must make one hundred revolutions to produce the same amount of movement of the shaft 71 as does the shaft 82 in one revolution. At 119 is shown a friction brake actuated by a spring 120 and serving to stop the movement of this train of gears instantly after the clutch 108 has been disengaged, thus preventing any inaccuracy owing to the momentum of the parts.

Shaft 89 also carries a clutch 121, one member of which is formed with a pinion 122 meshing with the gear of the hundredths section 98 of the counting mechanism, so that when the fractional circuit is running the winding shaft 66, the counting mechanism will record the amount of movement on the hundredths wheel 98.

As it is essential that the circuit shall begin to move the winding shaft 66 and the counting mechanism only after the units mechanism has stopped and that the units mechanism shall stop only at the end of an even unit, special mechanism for this purpose is provided. The clutch hub 81, previously referred to, is loose on shaft 82 and is located on one side against a collar 150 which is fixed on the shaft 82. On the other side of the clutch hub 81 is a friction member 151 and a spring 152 which rest against a second collar 153 which is fixed to the shaft 82. On the clutch hub 81 is placed a pin 123 which extends toward the side of the frame. In the frame is formed a hole 124 into which the pin 123 can drop. It will be seen, therefore, that the shaft 82 can be moved to the right to disengage the clutches 90 and 97 only when the pin 123 is opposite the hole 124, and that as long as the pin 123 is in the hole 124, the clutch hub 81 will remain stationary even though the shaft 82 constantly revolves.

When the clutch fork 80 moves the shaft 82 to the left, as viewed in Figure 7, the clutch hub 81 begins to revolve with the shaft 82 as soon as the pin 123 comes out of the hole 124. This mechanism is such that the pinion 91 can be started to revolve at any point in the revolution of the shaft 82 but, when once started, must continue to revolve for at least one complete revolution after the starting, or for any multiple of complete revolutions. In other words, it will continue to revolve after the de-energization of the magnets 76 until it has completed the revolution already begun. The armature 78 of the magnets 76 which moves the shaft 82 operates the switch 104 which is in the fractional circuit. This mechanism is therefore such that after the contact arm 56 moves onto the brush 2, the fractional circuit will not be made until the pin 123 has dropped into the hole 124 and allowed the armature 78 to close the switch 104, thus starting the fractional mechanism only after the units mechanism has completed a revolution.

The releasing circuit will now be described. Its purpose is to restore the parts to starting position after the measurement of a hide has been completed. This circuit includes the top contact 3, the wire 125 and electro magnets 126. (See Figs. 2 and 9.) These magnets operate an armature 127 carried by a spring 128, and this armature has on it a clutch fork 129 the upper end of which is bent back on itself to form a stop finger $p$. The clutch fork 129 engages a hub 130 secured to a shaft 131 driven by a sprocket wheel 132 and chain 133 operated by a constantly running part of the machine. The other clutch member 135 is secured to a wheel 136 which has on its face a projection 137 so that the wheel is in effect a cam. In the path of this projection 137 is a lever arm 138 which forms one part of a member 139 pivoted at its end, as shown at 155, to a fixed part of the machine. This member is connected to each of several chains 140 which run to a series of pawls 141, two of which are shown in Figure 2. This construction is such that when the lever arm 138 is moved, the member 139 will move all of the pawls to release the groups of power-operated pulling mechanisms. The pawls engage projections 22 on the wheels 37 which wind up the flexible members 45 which operate the individual weights 53. On the face of the wheel 136 is a notch 145 to receive the point $p$ of the extension of the clutch fork 129, the purpose of this device being to prevent the clutch 130 being released except at one point in its revolution, thereby stopping the wheel 136 in such a position that it will actuate the pawls instantly the next time that the device is called upon to operate. The actuation of the various pawls permits all the weights to drop to their original position so that the machine is in shape to start again on a new hide.

At 146 and 147 are shown pivoted stops in the paths of the weights 53 and 55 respectively. These stops serve as buffers to absorb the shock of the drop of the weights when the machine is cleared. They also prevent the weights swinging back and forth in pendulum fashion and afford a means for testing the machine, since when they are not in contact with the weights, and drums 44 are all in normal position, the contact arm 56 should be poised in the position shown in Figures 2 and 11, the weights 53 and 55 being in equilibrium.

The operation of the machine is in general as follows:—The bed-roll 11 and the shafts 30, 82, 89 and 131 are constantly revolving. The operator feeds the hide to be measured through the machine in the ordinary manner. When the front edge begins to pass the contact members 16, they complete the (circuits through corresponding magnets 21 and start the rotation of the winding wheels 37, 40 and 43. The first pull of the winding wheels on the flexible members 45 pull the frame 50 to the right as viewed in Figure 2.

When the front edge of the hide lifts the first of the contact members 16, a gentle pull is exerted on the frame 50, and this moves the contact arm 56 downward bringing it into contact first with the contact $k$, as shown in Figure 12, completing the fractional circuit. This starts the winding of the flexible member 62 at the slow speed, shortening the connections between the frame 50 and the sector 61 and raising the grand weights 55 slightly. This movement continues until a sufficient number of the contact members 16 have been lifted by the advancing edge of the hide to exert a pull on the frame 50 great enough to carry the contact arm 56 down on to the contact surface 1, which movement makes the unit circuit and breaks the fractional circuit. The making of the unit circuit starts the winding of the flexible member 62 at the rapid speed. This procedure continues throughout practically the entire passage of the hide through the machine and as long as sufficient width of hide is passing under the contact fingers 16 to keep the contact arm 56 in the position shown in Figure 13. During all this period, the individual weights 53 and the grand weights 55 are gradually rising and the counting mechanism is moving in proportion to the number of revolutions which the winding mechanism for the grand weights makes. When the hide has passed through the machine to such an extent that there are enough contact fingers on it to keep the frame 50 from being pulled to the left as viewed in Figure 2, by the winding mechanism, the contact arm 56 rises, leaving contact surface 1 and passing outside of brush 2, as shown in Figure 14. This breaks the units circuit, stops the winding at rapid speed caused by shaft 82, and makes the fractional circuit again, starting the winding by shaft 89 which proceeds slowly.

The winding at slow speed proceeds until all of the contact fingers drop off the edge of the leather. When this happens, the fractional circuit continues to operate momentarily until the contact arm 56 rises snapping off the contact 2 to the contact 3, as shown in Figure 15. This completes the releasing circuit momentarily and releases the pawls 141, allowing all the parts except the counting mechanism to assume their original positions. The counting mechanism may be set back to zero by turning a handle 149, or it may be left undisturbed, in which latter case the measurement of the next hide that goes through the machine will be added to the totals already recorded by the counting mechanism.

It will be understood that the diameters of the wheels and gears in the machine will be so designed that a movement of one-tenth of a revolution of wheels 110 and 98 corresponds with the passage of a hundredth of a square foot of leather through the machine, while each tenth of a revolution of wheels 99 and 112 represents a tenth of a square foot; each tenth of a revolution of wheels 100 and 114 represents a square foot while 10 square feet are represented by a tenth of a revolution of wheel 101. It will be understood that the machine may be easily designed to measure square yards or square inches or meters or decimal or common fractions thereof.

What I claim is:—

1. In a leather measuring machine, a contact carrier and a contact member mounted to permit joint movement by the action of the leather on the contact carrier, the contact member adapted to have a movement independent of the carrier when engaged by the leather and registering mechanism which is controlled by the independent movement of one of said movable parts with relation to the other.

2. In a leather measuring machine, a contact carrier mounted to permit movement thereof by the action of the leather thereon, a contact member partaking of the bodily movement of the carrier but actuated only by contact with the leather, said contact member being so located with relation to the said carrier that the carrier will be moved to substantially the level of the advancing edge of the leather before the contact member is moved by the edge of the leather.

3. In a leather measuring machine, a contact carrier mounted to permit bodily movement thereof by the action of the leather thereon, said carrier being shaped so that the advancing edge of the leather will move it to the level of the surface of the leather, and a contact member partaking of the bodily movement of the carrier but actuated only by contact with the leather.

4. In a leather measuring machine, a contact carrier mounted to permit bodily movement thereof by the action of the leather thereon, said carrier being shaped so that the advancing edge of the leather will move it to the level of the surface of the leather, a contact member partaking of the bodily movement of the carrier but actuated only by contact with the leather, and mechanism set in motion by actuation of the contact member for indicating the distance which the material moves while it is in contact with the contact member.

5. In a leather measuring machine, a plurality of contact carriers mounted to permit individual movement toward and away from the surface of the leather, each carrier being shaped so that the advancing edge of the leather on contacting with it will move it to the level of the surface of the leather, a plurality of contact members each partaking of the bodily movement of one of the contact carriers but actuated only by contact with the leather and means set in motion by movement of said contact members for cumulating the lengths of the imaginary strips passing under the several contact members.

6. In a leather measuring machine, a bed member, a contact carrier movable toward and away from the bed member, a contact member partaking of the bodily movement of the contact carrier but actuated only by contact with the leather, and mechanism set in motion by the contact member for indicating the distance which the material to be measured moves while it is in contact with the contact member.

7. In a leather measuring machine, a bed member, a contact carrier, a movable contact finger co-operating with said bed member supported by said contact carrier and capable of being displaced by the passage of the article to be measured across the bed member, and an electric circuit including the contact finger arranged to be actuated only by the displacement of the contact finger.

8. In a leather measuring machine, a bed member, a contact carrier, a yielding contact finger co-operating with said bed member supported by said contact carrier and capable of being displaced by the passage of the article to be measured across the bed member, a contact point and an electric circuit including the contact finger and the contact point and so arranged that the movement of the finger relatively to the contact point, will modify the current flow through the circuit.

9. In a leather measuring machine, a bed member, a contact carrier, a yielding contact finger co-operating with said bed member supported by said contact carrier and capable of being displaced by the passage of the article to be measured across the bed member, a contact point located in position to be engaged by the finger when displaced by the article to be measured, and an electric circuit including the contact member and the contact point.

10. In a leather measuring machine, a bed member having a groove therein, a contact finger with its point normally in the groove of the bed member, an electric circuit including the contact finger, and means to keep the said contact member out of contact with the bed member.

11. In a leather measuring machine, a grooved bed roll, a perforated shield having a hole therein and supported closely adjacent the groove in the bed roll, a contact finger having a point extending through a hole in the shield into the groove in the bed roll but not into contact with the bed roll, and an electric circuit including the finger, the flow in which is modified by the movement of the finger relatively to the shield.

12. In a leather measuring machine, a grooved bed roll, a spoon-shaped shield having a hole therein and supported closely adjacent the groove in the bed roll, a contact finger having a point extending through the hole in the shield into the groove in the bed roll but not into contact therewith, a contact point mounted on the shield, and an electric circuit including the shield, the contact member, and the contact point, and arranged so that movement of the finger relatively to the shield will modify the flow of current in the circuit.

13. A bed, a plurality of actuators, pulling means equal in number to said actuators, said pulling means being set in motion by said actuators and each capable of exerting a pull, representing length of leather passing between the bed and the actuator, a single yielding means capable of resisting the total pull exerted by said pulling means, and means for registering the displacement of said yielding means.

14. A bed roll, a shaft revolved synchronously with the bed roll, a plurality of actuators arranged along the bed roll, groups of pulling mechanisms driven by said shaft and connected thereto and disconnected therefrom by said actuators, each of the groups being arranged to exert a pull continuously while connected to said shaft, a single yielding means capable of resisting the total pull exerted by said pulling means, and means for registering the displacement of said yielding means.

15. In a leather measuring machine, a bed member, a movable contact carrier, a contact member movably mounted on said contact carrier and cooperating with said bed member, and counting mechanism controlled only by movement of said contact member with respect to said contact carrier.

16. In a leather measuring machine, a bed member, a movable contact member co-operating with the bed member, a movable shield supporting said contact member, and counting mechanism actuated only by the movement of the contact member.

17. In a leather measuring machine, a bed member, a contact member co-operating with the bed member, a shield for the contact member, both the contact member and the shield being movable relatively to the bed member and independently of each other, and counting mechanism actuated by the movement of the contact member.

18. In a leather measuring machine, a bed member, a contact member co-operating with the bed member, a shield for the contact member the side and front edges of which are inclined away from the bed member to facilitate movement of the leather forward and sideways under said shield, said shield and contact member being both movable relatively to the bed member and independently of each other, and counting mechanism actuated by the movement of the contact member.

19. In a leather measuring machine, a bed member, a series of contact mechanisms to be moved by contact with the leather passing through the machine and arranged lengthwise of the bed roll, a source of power, a constantly driven member, counting mechanisms for said contact mechanisms, and connections between said several contact mechanisms and the respective counting mechanisms so that the counting mechanism shall be operated by the constantly driven member whenever the contact mechanism is operated by contact with the leather to be measured.

20. In a machine of the character described, a series of individual weights, one or more grand weights to counterbalance the entire series of individual weights, means operated by the passage of leather through the machine to displace some of the individual weights, means to restore the condition of balance, and means to register the movement of the balance-restoring means.

21. In a machine of the character described, a bed, a plurality of actuators, a plurality of pulling means equal in number to said actuators, a second pulling device capable of exerting a pull equal and opposite to that of said first mentioned pulling means, a flexible connection between said first and second mentioned pulling means, and means for shortening the connections to maintain equilibrium between the parts.

22. In a machine of the character described, a bed, a plurality of actuators, a plurality of pulling means equal in number to said actuators, a second pulling device capable of exerting a pull equal and opposite to that of said first mentioned pulling means, a flexible connection between said first and second mentioned pulling means, and means for winding up the connections to maintain equilibrium between the parts.

23. In a machine of the character described, a bed, a plurality of actuators, pulling means operated by the actuators, a series of weights one for each actuator, a frame supporting said weights, a grand weight capable of resisting the force exerted by a plurality of said actuators, flexible connections between said frame and said grand weight, winding mechanism to shorten the said flexible connection, electrically controlled mechanism to operate said winding mechanism, and means actuated by the movement of said frame to control said electric mechanism.

24. In a machine of the character described, a bed, a plurality of actuators, pulling means operated by the actuators, a series of weights one for each actuator, a frame supporting said weights, a contact arm on said frame, a grand weight capable of resisting the force exerted by a plurality of said actuators, flexible connections between said frame and grand weight, winding mechanism therefor, electrically operated high speed and low speed mechanisms for the winding mechanism, electric circuits for each of said driving mechanisms, said electric circuits being controlled by said contact arm.

25. In a machine of the character described, a bed, a plurality of actuators, pulling means operated by the actuators, a series of weights one for each actuator, a frame supporting said weights, a contact arm on said frame, a grand weight capable of resisting the force exerted by a plurality of said actuators, flexible connections between said frame and grand weight, winding mechanism, two constantly running shafts, one of said shafts being adapted to drive the winding mechanism at a slower speed than the other, clutches between said shafts and said winding mechanism, electro magnets operating said clutches, two electric circuits including said magnets, said electric circuits being controlled by said contact arm.

26. In a machine of the character described, a bed, a plurality of actuators, pulling means operated by the actuators, a series of weights for each actuator, pulling mechanism, ratchet and pawl mechanism to prevent movement of the pulling mechanism in the reverse direction, a frame supporting said weights, a grand weight capable of resisting the force exerted by a plurality of said actuators, flexible connections between said frame and grand weight, winding mechanism for the flexible connection, and three electric circuits, one to operate the winding mechanism at rapid speed, one to operate it at slow speed, and the third to release the ratchet and pawl mechanism, said circuit being operated successively by said contact arm.

27. In a machine of the character described, a series of individual weights, a suspended common support for the entire series, one or more grand weights adapted to counterbalance the said series of weights, connections between the said support and said grand weight or weights, means actuated by the passage of the leather through the machine to change the position of some of the individual weights, and power actuated means acting on the said connections to restore the condition of balance between said opposing weights.

28. In a machine of the character described, a series of individual weights, a suspended common support for the entire series, one or more grand weights adapted to counterbalance the entire series, flexible connections between the said support and said grand weight or weights, means actuated by the passage of leather through the machine to change the position of some of the individual weights, and winding mechanism acting on said flexible connections to restore the condition of balance between said opposing weights.

29. In a machine of the character described, a series of individual weights, a suspended common support for the entire series, one or more grand weights adapted to counterbalance the entire series, flexible connections between the said support and said grand weight or weights, means actuated by the passage of leather through the machine to change the position of some of the individual weights, winding mechanism acting on said flexible connections to restore the condition of balance between said opposing weights, and power actuated devices capable of driving the winding mechanism at different speeds.

30. In a machine of the character described, a series of individual weights, a suspended common support for the entire series, one or more grand weights adapted to counterbalance the entire series, flexible connections between the said support and said grand weight or weights, means actuated for the passage of leather through the machine to change the position of some of the individual weights, winding mechanism acting on said flexible connections to restore the condition of balance between said opposing weights, and counting mechanism to register the revolutions of the winding mechanism.

31. In a machine of the character described, a series of individual weights, a suspended common support for the entire series, one or more grand weights adapted to counterbalance the entire series, flexible connections between the said support and said grand weight or weights, means actuated by the passage of leather through the machine to change the position of some of the individual weights, winding mechanism acting on said flexible connections to restore the condition of balance between said opposing weights, power actuated driving devices for said winding mechanism and electric controlling means therefor actuated by movements of the said suspended support for the said individual weights.

32. In a machine of the character described, a series of individual weights, a suspended common support for the entire series, one or more grand weights adapted to counterbalance the entire series, flexible connections between the said support and said grand weight or weights, means actuated by the passage of the leather through the machine to change the position of some of the individual weights, winding mechanism acting on said flexible connections to restore the condition of balance between said opposing weights, two power actuated driving devices for turning said winding mechanism at different speeds, an electric circuit controlling each of said driving devices, and switches operated by the movement of said common support to make and break said circuits.

33. In a machine of the character described, a series of individual weights, a suspended common support for the entire series, one or more grand weights adapted to counterbalance the entire series, flexible connections between the said support and said grand weight or weights, means actuated by the passage of leather through the machine to change the position of some of the individual weights, winding mechanism acting on said flexible connections to restore the condition of balance between said opposing weights, two power actuated driving devices for turning said winding mechanism at different speeds, an electric circuit controlling each of said driving devices, switches operated by the movement of said common support to make and break said circuits, and counting devices to register the revolutions of said driving devices.

34. In a machine of the character described, a plurality of contact fingers to be actuated by the leather to be measured, electric circuits including said fingers, a constantly running shaft, clutch mechanism on said shaft operated by said circuit, a drum operated thereby, a weight and a flexible member connecting the weight and the drum so arranged that the closing of the electric circuit will cause the shaft to lift the weight.

35. In a leather measuring machine, in combination, means for measuring strips of the material to be measured, means for directly cumulating the lengths of said strips without reducing said strips to an average, means for actuating said cumulating means, and electrically operated means controlled by said measuring means for controlling the connection of said cumulating means with said actuating means.

In testimony whereof I affix my signature.

ROBERT J. McFALL.